United States Patent
Lin et al.

(10) Patent No.: US 10,605,933 B2
(45) Date of Patent: Mar. 31, 2020

(54) X-RAY SPECTRAL CALIBRATION TECHNIQUE FOR CONE-BEAM CT

(71) Applicant: CARESTREAM HEALTH, INC., Rochester, NY (US)

(72) Inventors: Yuan Lin, Rochester, NY (US); William J. Sehnert, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 426 days.

(21) Appl. No.: 15/598,634

(22) Filed: May 18, 2017

(65) Prior Publication Data
US 2018/0113227 A1 Apr. 26, 2018

Related U.S. Application Data

(60) Provisional application No. 62/411,012, filed on Oct. 21, 2016.

(51) Int. Cl.
| | | |
|---|---|---|
| G01N 23/00 | (2006.01) | |
| G01T 7/00 | (2006.01) | |
| G01T 1/169 | (2006.01) | |
| G01T 1/40 | (2006.01) | |

(52) U.S. Cl.
CPC ............ G01T 7/005 (2013.01); G01T 1/169 (2013.01); G01T 1/40 (2013.01)

(58) Field of Classification Search
CPC .......... G01T 1/169; G01T 1/40; G01T 7/005; A61B 6/583; A61B 6/505; A61B 6/4423; A61B 6/508; A61B 6/14; A61B 5/4509; A61B 6/563; A61B 5/4504; A61B 6/482; A61B 5/002; A61B 5/0022; A61B 5/4547; A61B 5/7264; A61B 6/032; A61B 6/5205; A61B 6/585; A61B 6/584; A61B 5/055; A61B 6/037; A61B 6/4441; A61B 6/582; A61B 6/03; A61B 6/488; A61B 6/542; A61B 8/0875; A61B 2576/02; A61B 5/748; A61B 6/469; A61B 6/5217; A61B 8/5223; G01J 9/00; G09B 23/30; G01B 15/045; G06T 2207/30008; G06T 7/0012; G06T 2207/10116; G06T 7/41; G06T 2207/20036; G06T 7/11; G06T 7/20; G06T 2200/04; G06T 2207/20104; G06T 5/001;
(Continued)

(56) References Cited

U.S. PATENT DOCUMENTS 8,611,627 B2 * 12/2013 Wu .................... A61B 6/032
                                                          382/131
2008/0095302 A1 4/2008 Ruhrnschopf et al.
(Continued)

FOREIGN PATENT DOCUMENTS

WO        2016/003957        1/2016

OTHER PUBLICATIONS

Xinhui Duan et al., "CT scanner x-ray spectrum estimation from transmission measurements," Medical Physics 38(2), Feb. 2011, pp. 993-997.

*Primary Examiner* — Irakli Kiknadze

(57) ABSTRACT

A method for X-ray spectral calibration acquires X-ray projections of a calibration phantom formed of known materials. The X-ray spectrum of an X-ray source is calculated according to the acquired X-ray projections. The calculated X-ray spectrum can be stored, transmitted, or displayed.

15 Claims, 11 Drawing Sheets

(58) Field of Classification Search
CPC ........... G06T 2207/10081; G06T 2207/10088; G06T 7/62
USPC ........................................ 378/18, 70, 86–90
See application file for complete search history.

(56) References Cited

U.S. PATENT DOCUMENTS

2018/0078233 A1*  3/2018  Jin ..................... A61B 6/585
2018/0188391 A1*  7/2018  Daerr ................... G01T 1/24

* cited by examiner

X-RAY SPECTRAL CALIBRATION TECHNIQUE FOR CONE-BEAM CT

CROSS REFERENCE TO RELATED APPLICATIONS

This application claims the benefit of U.S. Provisional Application No. 62/411,012, filed Oct. 21, 2016, entitled X-RAY SPECTRAL CALIBRATION TECHNIQUE FOR CONE BEAM CT by Lin et al., which is hereby incorporated by reference in its entirety.

TECHNICAL FIELD

The present disclosure relates, in general, to the field of medical imaging, such as, radiography, tomosynthesis, computed tomography (CT), low-cost CT, and cone-beam CT (CBCT). In particular, the disclosure presents a method to calibrate the X-ray spectrum of a cone-beam CT (CBCT) scanner.

BACKGROUND OF THE INVENTION

With the continued growth of volume X-ray imaging with CBCT systems, there are increasing demands to estimate the spectra emitted from a CBCT scanner. For example, it is desirable for image quality assurance and quantitative imaging purposes to periodically monitor and characterize the output spectra and to make sure the X-ray tube output is consistent and accurate. The estimated spectra can also be used as prior information in poly-energetic reconstruction (or spectral reconstruction) and with scattered radiation correction to improve image quality. In addition, in patient dose and risk estimation, spectra are indispensable information for Monte Carlo based simulation methods.

Spectral calibration of X-ray output using conventional methods is costly and time-consuming, requiring special equipment and procedures that are not available at every installation. There are problems that make the spectral estimation of the CBCT a challenge.

Accurate measurements can be difficult to obtain. This is in part because of the large opening of the X-ray beam with CBCT. Scattered radiation may contaminate the detector signals and make calibration results inaccurate.

Conventional methods for spectral calibration of the X-ray equipment can be labor-intensive and tedious. In conventional practice, the cone-beam X-ray is first collimated into pencil-beam shape to reduce scatter, and then a series of projections are acquired using different thickness of metals (e.g., Al or Cu) or step phantoms. A spectrometer can be used to measure the spectrum with one exposure; however, the alignment task is complex. It proves to be very difficult to align the pencil-beam collimator of the CBCT scanner with the collimator of the spectrometer. There are special setup considerations because of the high sensitivity of spectrometer instrumentation. The spectrometer is costly, and not all imaging centers or clinics can afford such instrumentation or the specialized staff needed for setting up and operating this equipment.

To address the above problems, this disclosure proposes an efficient spectral calibration technique that operates by imaging a phantom and iteratively approximating the inherent filtration of the system until a close estimate of the spectral content of the X-ray energy is obtained.

SUMMARY

Certain embodiments described herein address the need for methods for spectral calibration of a CBCT system. The method described herein obviates the need for acquiring multiple images using step phantoms or using spectrometry instrumentation for spectral characterization of the X-ray emission.

These aspects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to an embodiment of the present disclosure, there is provided a method for X-ray spectral calibration comprising: a) acquiring a plurality of X-ray projections of a calibration phantom formed of known materials; b) calculating the X-ray spectrum of an X-ray source according to the acquired X-ray projections; and c) storing, transmitting, or displaying the calculated X-ray spectrum.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE DISCLOSURE

Figure 1:
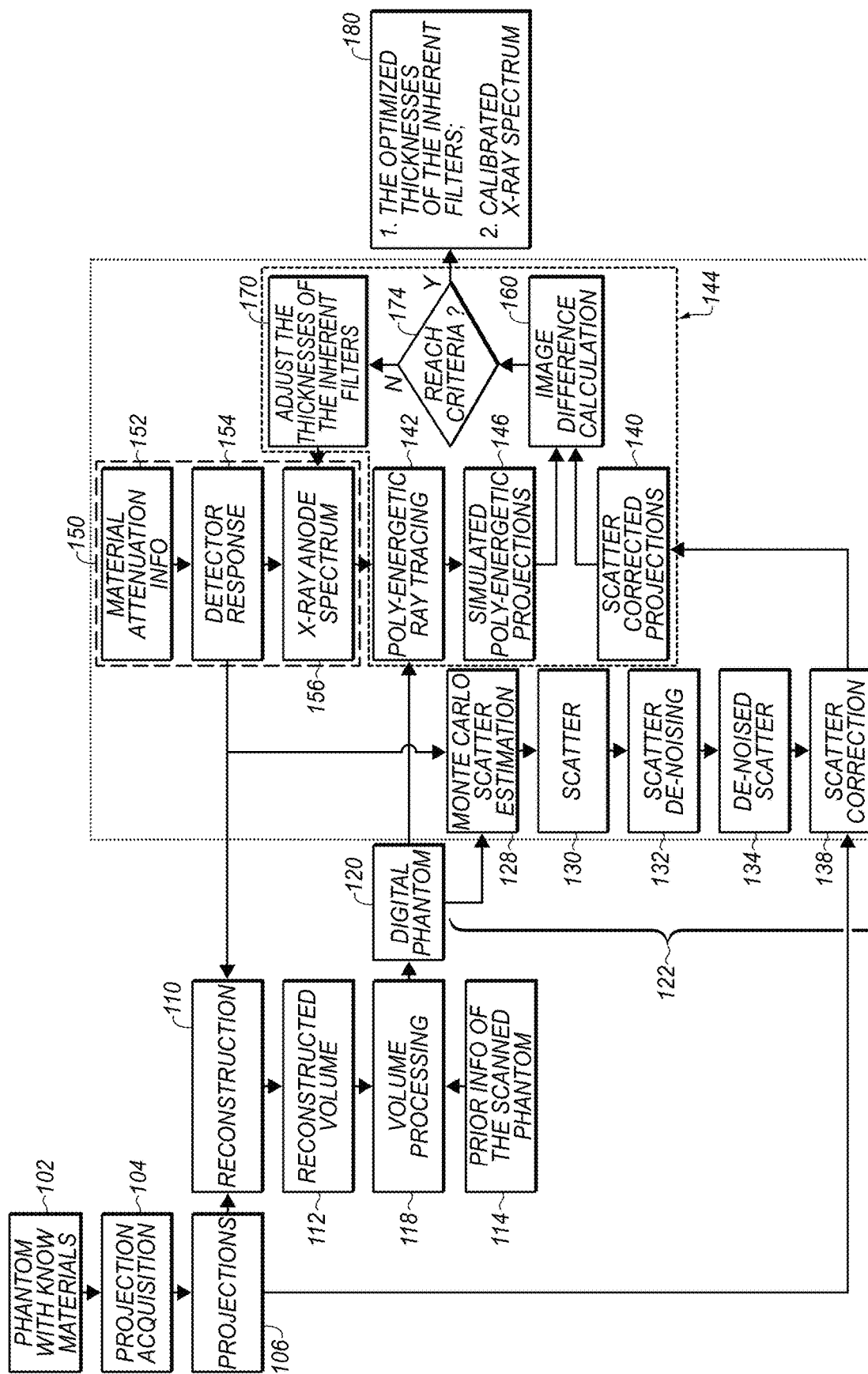
FIG. 1 is a logic flow diagram showing a sequence for spectral calibration according to an embodiment of the present disclosure.

The following is a detailed description of the embodiments of the invention, reference being made to the drawings in which the same reference numerals identify the same elements of structure in each of the several figures.

Where they are used in the context of the present disclosure, the terms "first", "second", and so on, do not necessarily denote any ordinal, sequential, or priority relation, but are simply used to more clearly distinguish one step, element, or set of elements from another, unless specified otherwise.

As used herein, the term "energizable" relates to a device or set of components that perform an indicated function upon receiving power and, optionally, upon receiving an enabling signal.

In the context of the present disclosure, the phrase "in signal communication" indicates that two or more devices and/or components are capable of communicating with each other via signals that travel over some type of signal path. Signal communication may be wired or wireless. The signals may be communication, power, data, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

In the context of the present disclosure, the term "subject" is used to describe the object that is imaged, such as the "subject patient", for example. The terms "viewer", "operator", and "user" are considered to be equivalent and refer to the viewing practitioner, technician, or other person who operates or services the imaging system and may use an operator interface to enter commands and view results of an image-related process, including test and calibration, on a control monitor. An "operator instruction" or "viewer instruction" is obtained from explicit commands entered by the viewer, such as by clicking a button displayed on a screen or by using a computer mouse, touch screen, or keyboard entry.

Radio-opaque materials provide sufficient absorption of X-ray energy so that the materials are distinctly perceptible within the acquired image content. Radio-translucent or transparent materials are imperceptible or only very slightly perceptible in the acquired radiographic image content.

In the context of the present disclosure, "volume image content" describes the reconstructed image data for an imaged subject, generally stored as a set of voxels. Image display utilities use the volume image content in order to display features within the volume, selecting specific voxels that represent the volume content for rendering a particular slice or view of the imaged subject. Thus, volume image content is the body of resource information that is obtained from a radiographic or other volume imaging apparatus such as a CT, CBCT, MDCT, MRI, PET, tomosynthesis, or other volume imaging device that uses a reconstruction process and that can be used to generate depth visualizations of the imaged subject.

Examples given herein that may relate to particular anatomy or imaging modality are considered to be illustrative and non-limiting. Embodiments of the present disclosure can be applied for 3D imaging modalities, such as CT, MDCT, CBCT, tomosynthesis, dual energy CT, or spectral CT.

In the context of the present disclosure, the term "volume image" is synonymous with the terms "3 dimensional image" or "3D image".

In the context of the present disclosure, a radiographic projection image, more simply termed a "projection image" or "X-ray image", is a 2D image formed from the projection of X-rays through a subject. In conventional radiography, a single projection image of a subject can be obtained and analyzed. In volume imaging such as CT, MDCT, and CBCT imaging, multiple projection images are obtained in series, then processed to combine information from different perspectives in order to form image voxels.

Reference is hereby made to an article by Duan, Wang, Yu, Leng, and McCollough entitled "CT Scanner x-ray spectrum estimation from transmission measurements" Medical Physics 38 (2) February 2011, pages 993-997.

Spectral calibration for a CBCT X-ray source can be designed to compensate for two particular problems:

(i) Scatter. Typically more pronounced for radiation at lower energy levels, scatter can be characterized and compensation provided, based on known information about the spectrum and material attenuation properties. Scatter is particularly noticeable with CBCT imaging.

(ii) Beam hardening. Beam hardening is an imaging phenomenon that occurs when a polychromatic X-ray beam passes through a subject. Low energy photons are absorbed by the subject material; higher energy photons, however, pass through the material and proceed to the detector.

As a result of this behavior, the logarithmic attenuation is no longer a linear function of subject thickness. In order to limit this effect, various types of beam filtering can be applied, along with correction for non-linearity of response.

Embodiments of the present disclosure are directed to apparatus and methods that can be particularly useful for characterizing the spectral output using both scatter (i) and beam hardening (ii) with volume imaging apparatus such as a CBCT system. The characterized spectral output can then be stored and used for generating images from the system.

In conventional CBCT configurations, the X-ray tube and detector rotate synchronously around an object. CBCT images, acquired at various angular positions with respect to an imaged object, measure X-ray attenuation through the object. Subsequent image data processing and combination provides a reconstruction that allows display of cross-sectional image data revealing the inner structure of the object. Reconstructed images are representative of the attenuation corresponding to each voxel within the imaged volume.

Spectral calibration for CBCT imaging has a number of aspects. For the CBCT detector, response to incident energy at different spectral levels is measured and appropriate correction can be calculated as a result of the calibration process.

Detector elements are designed to exhibit a consistent response to incident ionizing radiation over the full spectral range. Otherwise, spectral response differences between detector elements would cause various types of imaging artifacts. For detector elements arranged in a detector array, a spectral detector calibration is executed to determine residual spectral response differences among detector elements so that reconstructed images of standard phantoms are uniform and free of artifacts.

It is also desired to characterize the spectral energy of the CBCT X-ray source. Spectral calibration of the CBCT system helps to characterize the output signal in order that an accurate reconstruction volume can be generated. X-ray spectra often have wide energy bandwidths, typically ranging from a few tens of keV to more than a hundred keV. The spectral characteristics of an X-ray source can vary from one manufacturer to another and can also vary for tubes from the same manufacturer due to fabrication differences.

Spectral characteristics of the X-ray source also change with age and with the relative amount of inherent filtration that is provided with the source, generally expressed in terms of equivalent filtration sheet thickness. Inherent filtration, not adjustable by the operator, can be provided by the material composition of the X-ray tube itself and can be affected by variables such as the amount of oil/coolant internal to the X-ray bulb and amounts of material emitted from the anode and deposited on bulb surfaces.

At sites that pay careful attention to equipment performance and calibration, spectral calibration is often performed periodically, such as every few months. Because of the complexity of the calibration procedure, well-trained technicians are needed in order to perform these calibrations. However, as noted previously, some sites fail to carry out recommended spectral calibration practices due to cost, complexity, and the required down-time.

In embodiments of the present disclosure, spectral calibration does not require special measurement equipment or highly trained calibration personnel. Instead, spectral calibration can be provided by scanning a uniform phantom made of a known material, such as water or water-like material. It has been found that detector response to an X-ray signal attenuated through a given length of water can be used in a process that characterizes the spectral content of the signal by iteratively comparing acquired imaging results with calculated results for the primary image or, alternately, for the scatter content that is obtained.

An embodiment of the present disclosure addresses the need for spectral calibration of the X-ray source using an initial set of projection images that have been scanned from a calibration phantom using appropriate technique settings. The Applicants' method reconstructs a digital phantom using the initial set of acquired projections and using prior knowledge of the material composition and other features of the calibration phantom. The digital phantom is a data structure, reconstructed as an image volume from projections of the actual phantom, and corrected to suppress or eliminate artifacts from the image acquisition or reconstruction process. Scatter is estimated and compensation is applied in order to achieve consistency between the acquired projections and scatter-corrected projections. The acquired, scatter-corrected projections are compared against simulated, analytical polyenergetic projections of the digital phantom that are calculated using the initial X-ray spectrum. The image difference between actual, scatter-corrected and simulated poly-energetic projections is then used to correct data relating to the X-ray spectrum, such as by recalculating the virtual inherent filtration of the X-ray source.

Iterative processing then recalculates both the scatter correction and the analytical, simulated projections, repeating the comparison to refine the X-ray spectrum characterization. One or more iterations can then provide an accurate characterization of the X-ray spectrum and of the virtual inherent filtration of the X-ray source.

The Applicants' approach employs, as synthesized digital structures, a digital phantom, synthesized projections formed using ray tracing or other forward projection methods, and a set of virtual inherent filters. In the method described by the Applicants, known relationships of scatter to radiation energy levels provide an indicator that shows how well the spectral characteristics of the X-ray source have been approximated.

Applicants' technique adjusts the thicknesses of the 'virtual' inherent filters to iteratively modify the initial spectrum and reach a self-consistent condition, wherein the differences between scatter-corrected projections and simulated projections are minimum. By 'virtual', the Applicants mean that the inherent filters might not use actual inherent filters; virtual filters are calculated, introduced as parameters for conditioning data such that it is possible to modify (i.e., soften and harden) the spectrum.

The actual signal that is received from a projection image is the combination of a primary signal and scatter signal. Both the primary and the scatter signals, in turn, depend on the spectral composition of the X-ray source, the imaged object, and detector sensitivity. Embodiments for spectral calibration used herein characterize the spectral content of the X-ray signal by iterative processing that estimates primary and scatter signals and compares these estimates with actual measured valued. Iterative processing continues to refine the estimates until achieving self-consistent results, in which the estimated and actual values are identical or very nearly the same. The first embodiment described below focuses on the primary signal or primary image content, attempting to eliminate scatter from the comparison. The second embodiment, subsequently described, alternatively uses the scatter content itself as an indicator of spectral content.

First Embodiment—Primary Image Analysis

A first embodiment/implementation is shown in FIG. 1. In this embodiment, the detector response is pre-determined and is known. An initial X-ray spectrum is also obtained as a starting-point. Typically the initial spectrum is provided by the X-ray tube manufacturer.

With regard to FIG. 1:

1. A calibration phantom 102 with known materials is employed. The phantom 102 can be made of either a single material (such as water phantom or Aluminum step phantom) or of multiple materials. There is no constraint to the shape of calibration phantom 102; Applicants recover its shape in the reconstruction procedure. However, the material distribution of the phantom 102 is known, i.e., the materials should be identifiable in the reconstructed volume. It should be noted that if a water phantom is used and the wall of the encasing container is thick, then it is preferred that the container material should be considered and not ignored.

2. In a projection acquisition step 104, the calibration phantom 102 is scanned to acquire a series of CBCT projections 106 using an appropriate acquisition protocol for spectral calibration (e.g., 90 kVp).

3. In a reconstruction step 110, the volume image 112 of the scanned phantom is reconstructed with the acquired projections 106, an initial source X-ray spectrum, and other related system information (such as material attenuation information and detector response). It is preferred that the kVp of the initial X-ray spectrum used in these calculations match that of the acquisition protocol. Acquired projections 106 will be scatter-corrected and used for comparison in subsequent steps of the FIG. 1 process.

Figure 2B:
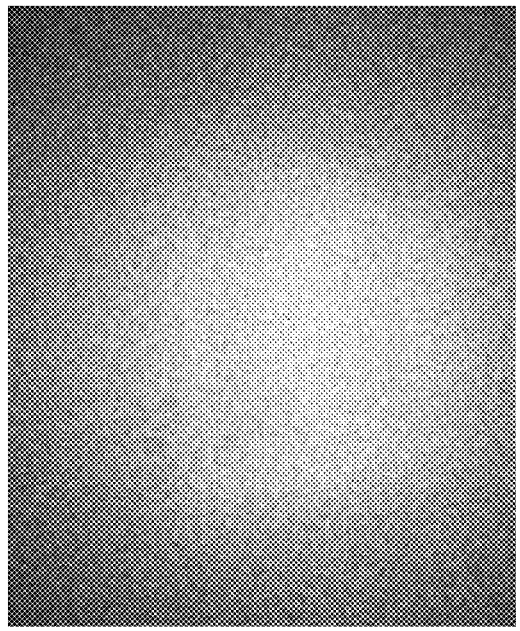
FIG. 2B shows an estimated scatter signal, prior to de-noising.
Figure 2A:
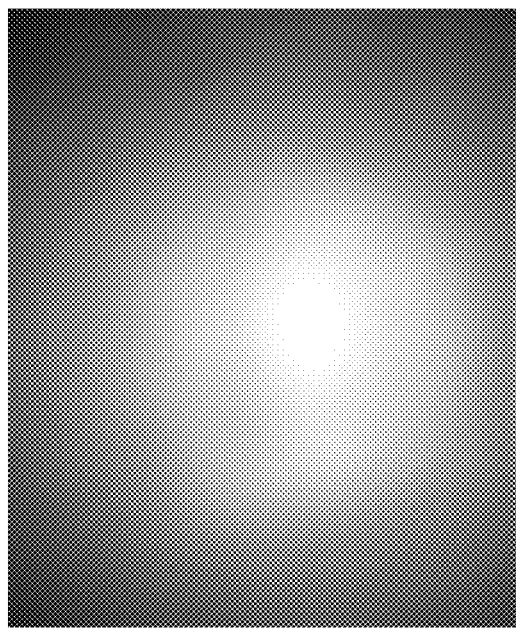
FIG. 2A shows an exemplary scatter signal.

4. In a volume processing step 118, using prior information 114 of the scanned calibration phantom and appropriate image processing techniques (such as segmentation, registration, etc.), the reconstructed volume is converted into a digital phantom 120, a collection of 3D data representative of the actual phantom without artifacts. The digital phantom 120 then provides a basis for subsequent calculations in the FIG. 1 process that estimate and correct for scatter, as shown in the example of FIG. 2A, and that take beam hardening into account. The digital phantom 120 can be considered as an "ideal" phantom volume formed for the given imaging apparatus.

5. An actual scatter estimation sequence 122 executes a set of steps for estimating scatter, wherein the estimate is used to correct scatter in the acquired image projections 106. Scatter 130 can be estimated using data from the digital phantom and using other system information in a scatter estimation step 128. Scatter estimation step 128 can use Monte Carlo estimation to estimate scatter, as shown in the example of FIG. 2B, applying techniques familiar to those skilled in the radiographic noise characterization and compensation arts. Scatter estimation can also use system information 150 that relates to the primary measured energy that is sensed by the digital radiography (DR) detector. As shown in FIG. 1, this can include information on the attenuation factor µ that is characteristic of the phantom material. Other factors that directly impact the primary measurement include detector response D(E) and the anode spectrum $S_a(E)$. A scatter denoising step 132 can process the calculated scatter (FIG. 2B), reducing noise content to generate denoised scatter 134 (FIG. 2A) using the processed data from the digital phantom and using system data. In scatter correction step 138, the calculated denoised scatter can be subtracted from the acquired projections 106 data in order to yield scatter corrected projections 140. The scatter-corrected projections 140 represent the primary image content, with scatter suppressed. Scatter-corrected projections 140 are then considered as fixed references, used for comparison with computed projections, simulated poly-energetic projections 146, to control the iterative processing described subsequently.

6. An iterative process 144 then executes in order to determine the amount of virtual inherent filtration that can help estimate the X-ray spectrum from the X-ray tube after all filtration. Simulated poly-energetic projections 146 are computed analytically (e.g., using a poly-energetic ray-tracing technique 142). The simulated poly-energetic projections 146 can be generated using forward projection through the digital phantom 120, applying known data about the composition and thickness of the phantom material and its material attenuation characteristics, and detector response characteristics 154.

7. In iterative process 144, the effective virtual filtration of the X-ray source is computed in terms of thicknesses of the inherent filters, typically expressed in terms of Al or Cu sheet thickness. The computed values are adjusted iteratively. A sequence of iterative procedures uses and modifies this data using system information 150, as outlined in the dashed box, to modify (e.g., harden or soften) the X-ray spectrum characterization.

These iterative procedures operate by computations that seek to minimize the image difference between the scatter corrected projections 140 (Primary images) and the simulated poly-energetic projections 146, with the comparisons executed in an image difference step 160. An adjustment step 170 can modify the calculated X-ray anode spectrum 156 characterization using the step 160 results, along with factors from phantom material attenuation information 152 and detector response characteristic 154. These factors affect both scatter correction processes and beam hardening compensation. Adjustment step 170 operates by correcting calculated values for the virtual inherent filters according to the image difference, as shown in FIG. 1.

It should be noted that, in difference step 160, it can be preferable to compute the image difference in the log exposure space, otherwise, in the linear exposure space, the difference would be biased towards the high exposure regions. However, the lower exposure regions are usually more important for diagnostic purposes.

A decision step 174 determines whether or not calculations in the image difference step 160 provide suitable results for terminating the iterative computations and providing a suitable spectral characterization in terms of virtual filter thickness. Where predetermined threshold criteria have not been satisfied, an adjustment step 170 adjusts the thickness calculated for the virtual filters used in system information 150 and calculation for simulated projections 146 is repeated.

The output of the FIG. 1 process is optimized calculated thickness data for the virtual inherent filters and a resulting calibrated X-ray spectrum 180, with spectral calibration characterization for the kVp values used.

8. Iterative process 144 repeats the sequence of steps that generate improved simulated poly-energetic projections 146 until satisfactory results are measured or an appropriate number of iterations have been executed.

It should be noted that the Applicants have two separated iterative procedures by intent; the Applicants have noted significant differences in computing speed and complexity between the relatively efficient computation of poly-energetic projections and the relatively slow process of scatter correction.

9. The predefined criteria used in decision step 174 can include variables such as number of iterations, accuracy, threshold difference values, and the like. The calculated thickness equivalent values for the virtual inherent filters and the calibrated spectrum can be saved into files or otherwise recorded for later use in processing image data for subsequent volume imaging. Spectral calibration values can also be displayed numerically or graphically, such as for analysis or troubleshooting, for example.

The first embodiment of FIG. 1 thus characterizes the X-ray spectrum using the comparison between (i) primary image content from the actual projections, with scatter suppressed or corrected, and (ii) simulated, computed image content having appropriate filtration to suppress scatter.

Second Embodiment—Scatter Analysis

By comparison with the first embodiment that attempts to suppress scatter so that actual and simulated projections can be compared, an alternate embodiment uses scatter to characterizes the X-ray spectrum. This approach takes advantage of the fact that scatter, although undesirable in a radiographic image, can be indicative of the spectrum of the X-ray signal and varies predictably with changes in the spectral content for CBCT radiation. This second embodiment characterizes the X-ray spectrum by comparing the actual scatter signal from acquired image content with simulated, calculated scatter that would be generated with a given filtration level.

Figure 3:
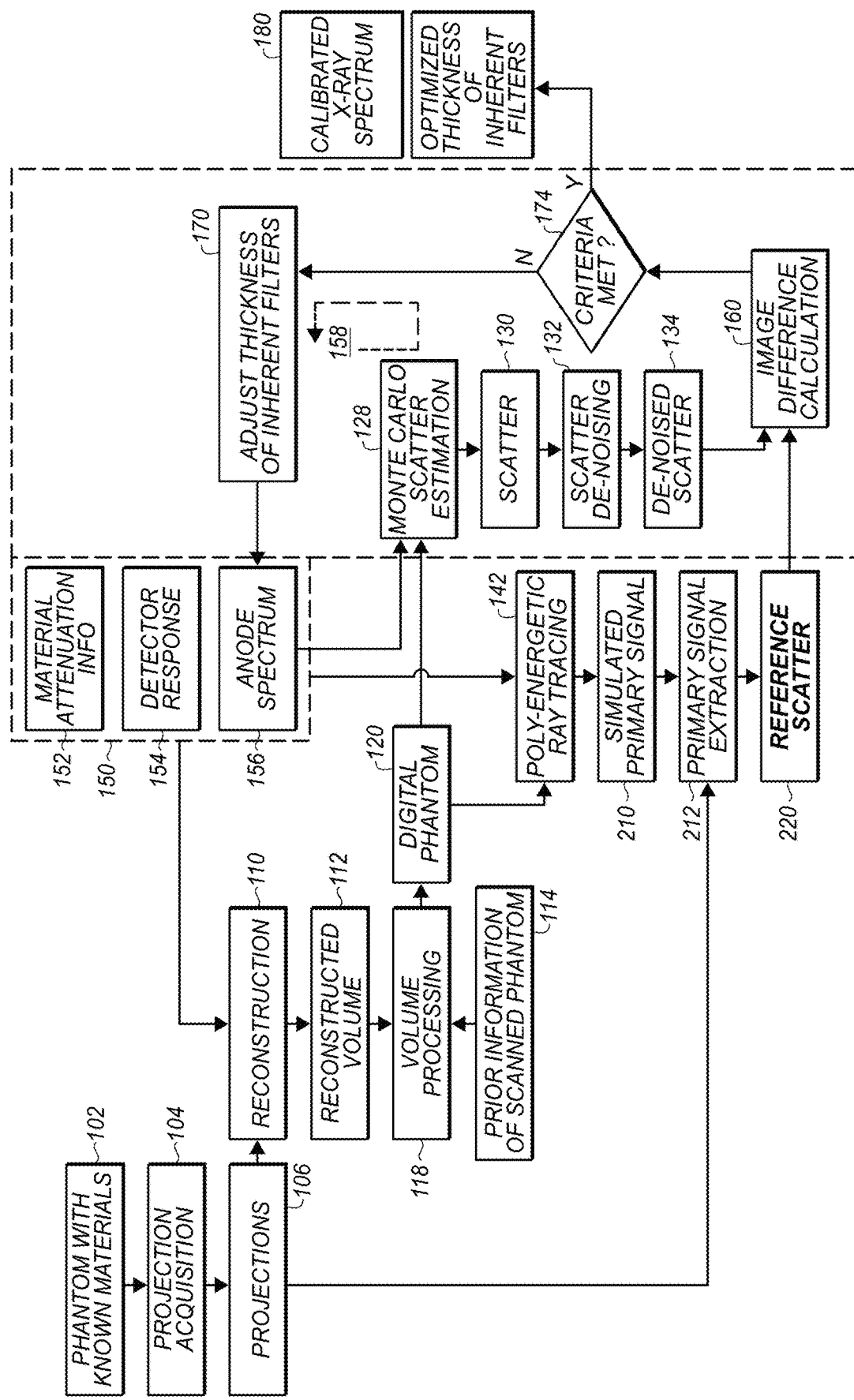
FIG. 3 is a logic flow diagram showing a sequence for spectral calibration according to an alternate embodiment of the present disclosure.

The second embodiment is described with regard to FIG. 3. Initial steps for forming the digital phantom 120 are similar to those shown in FIG. 1. However, as will be shown, scatter and beam hardening factors are considered in an alternative order.

In the process shown in FIG. 3, the detector response D(E) 154 can be unknown, but the initial anode spectrum $S_a(E)$ 156 is known, i.e.:

$$S_d(E) = D(E) \times S_a(E) \tag{1}$$

where $S_d(E)$ is fixed, both detector response D(E) and $S_a(E)$ are computed. Value $S_d(E)$ represents the signal content that is measured at the detector. Value $S_a(E)$ is the effective spectrum following filtration.

The Applicants' approach use the following scheme: each time the Applicants' process modifies the anode spectrum 156, the process updates the detector response D(E) 154 using the above equation (1).

With regard to FIG. 3:

1. The method is similar with the embodiment of FIG. 1, wherein Applicants generate and process the reconstructed volume 112, conditioning the volume data according to known information about the actual scanned calibration phantom to form the synthesized digital phantom 120. As with the FIG. 1 sequence, a suitable kVp value is used for projection acquisition step 104.

2. As the simulated poly-energetic projections only depend on the detector spectrum, and the detector spectrum is known, Applicants' method would be able to compute accurate poly-energetic projections and to extract scatter from the acquired projections as reference information.

In calculating reference scatter 220, ray tracing from poly-energetic ray-tracing technique 142 generates simulated primary signals 210, which are extracted in a primary signal extraction step 212. The primary measured energy $P_i$, for a pixel i, including scatter, can be expressed as:

$$P_i = \int N(E) E D(E) e^{-\int \mu(E) dL} dE \quad (2)$$

wherein N(E) expresses the number of photons generated, E is the energy level, D(E) is the detector response, μ(E) is the attenuation for the phantom material and L is the thickness or distance through the material for the signal to pixel i. The signal that is actually measured in each of the acquired projections 106 is the primary signal $P_i$ plus scatter S (FIG. 2A), that is:

$$\text{Measured signal} = P_i + S \quad (3)$$

Extraction step 212 subtracts the computed primary signal from the measured signal in order to obtain the reference scatter 220.

An iterative process 158 then calculates scatter for the digital phantom 120 using the current anode spectrum 156 and related system information 150. Monte Carlo scatter estimation is provided in a scatter estimation step 128, as shown in the example of FIG. 2B, generating a calculated scatter 130. A denoising step 132 then performs denoising operations to generate calculated denoised scatter 134 (FIG. 2A). An image difference step 160 compares the calculated scatter against the reference scatter 220 in order to determine whether to continue iterations that adjust inherent virtual filters in adjustment step 170.

3. By adjusting the thickness of the inherent virtual filters, the method of FIG. 3 iteratively simulates scatter projections to match the reference scatter images. As Applicants have noted, each time the iterative process 158 modifies the anode spectrum 156, it updates the detector response using the above equation for improved consistency.

Figure 4:
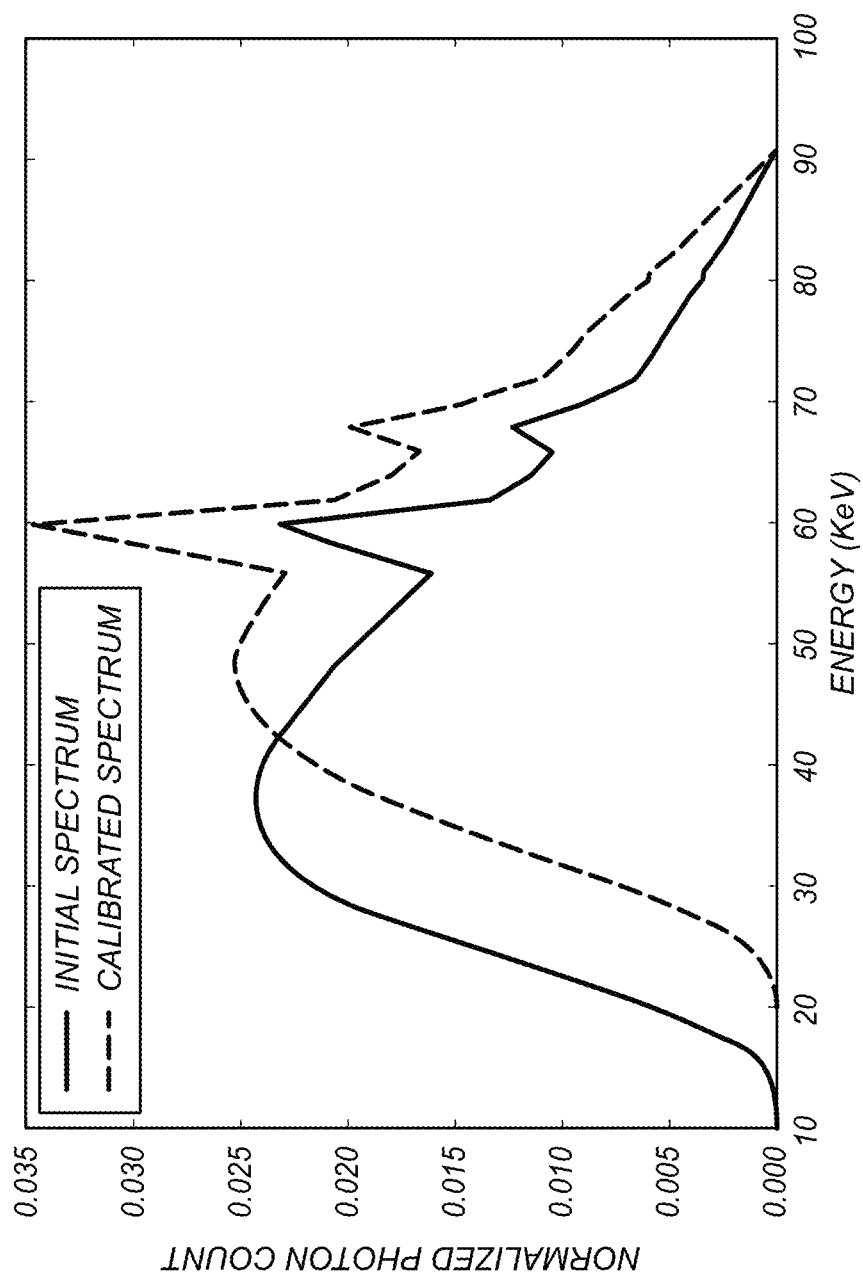
FIG. 4 is a graph that shows exemplary initial and calibrated spectra.

Experiments were carried out to validate the first scheme (FIG. 1) of the proposed technique. Referring to FIG. 4, the initial spectrum and the calibrated spectrum are plotted. A water phantom with very thin container wall was used.

Experiment 1

Figure 5B:
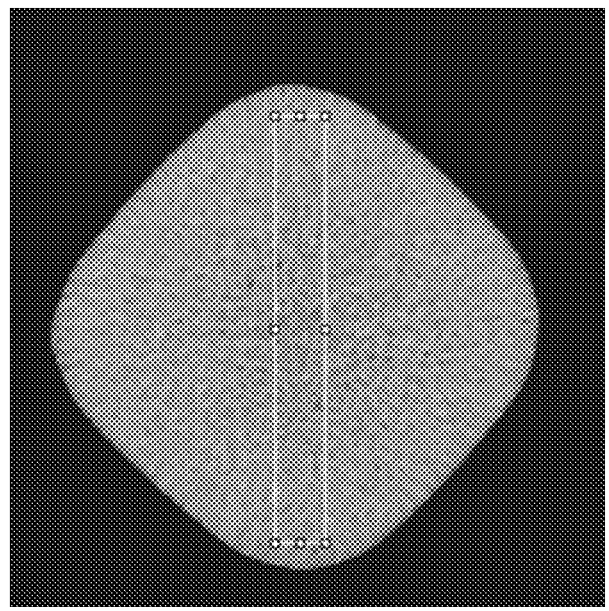
FIG. 5B shows a phantom reconstruction for a calibrated X-ray source.
Figure 5A:
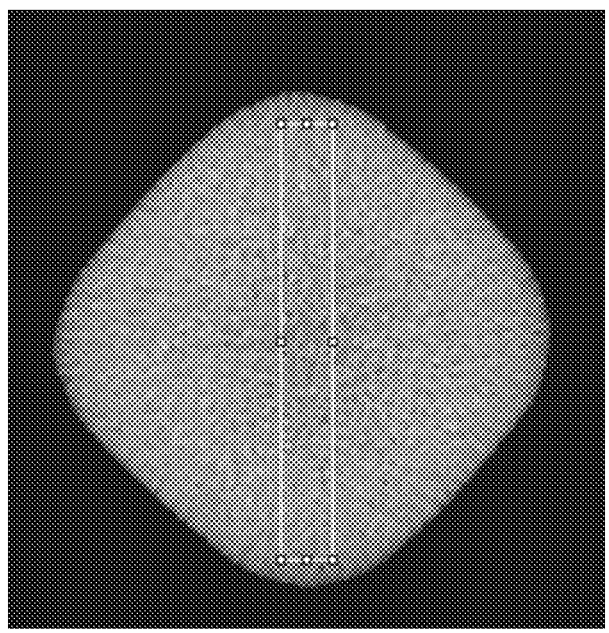
FIG. 5A shows a phantom reconstruction for an uncalibrated X-ray source.
Figure 6A:
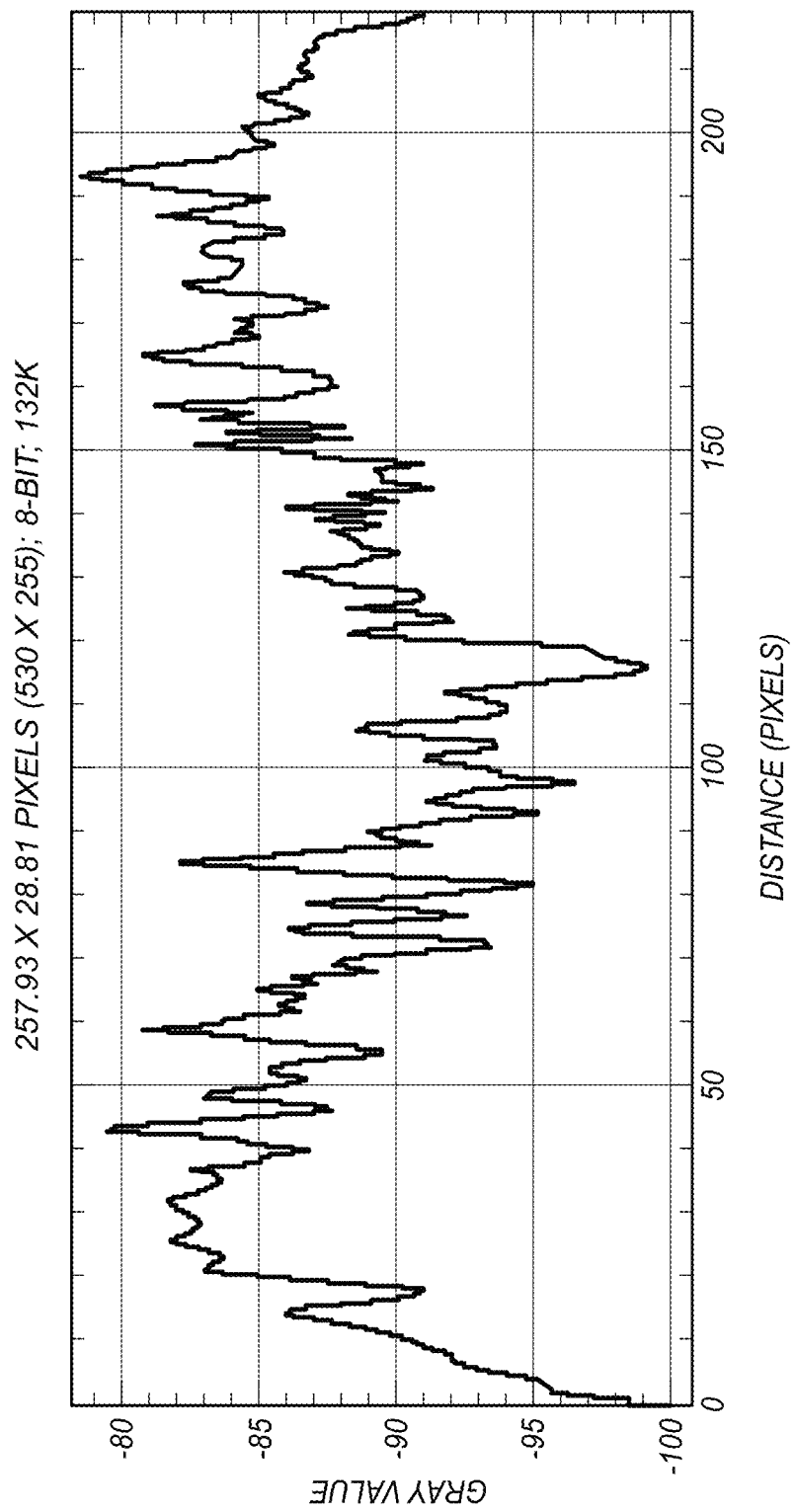
FIG. 6A is a graph showing Hounsfield unit values for an uncalibrated X-ray source.
Figure 6B:
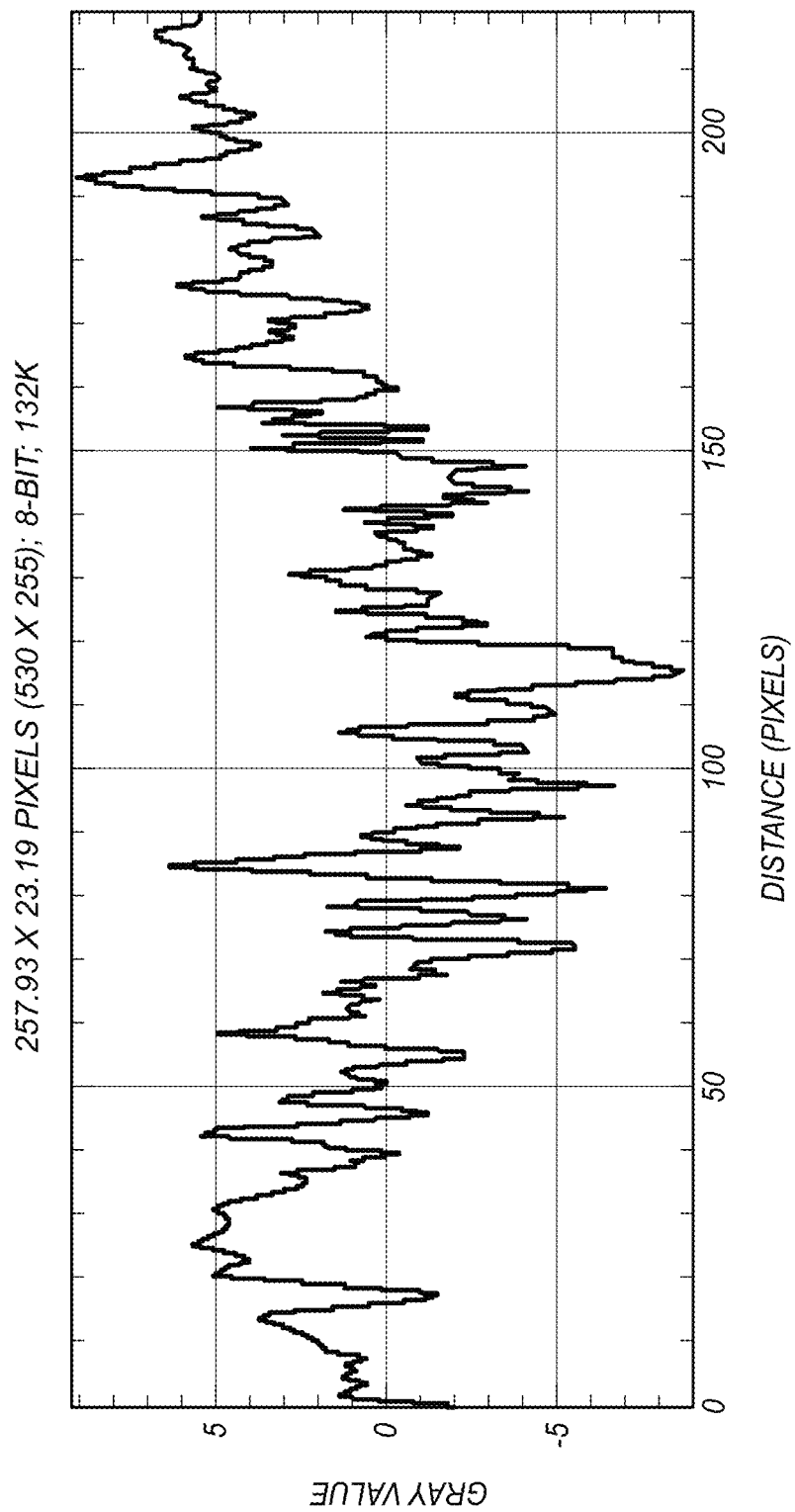
FIG. 6B is a graph showing Hounsfield unit values for a calibrated X-ray source.

Using the spectra of FIG. 4, a water phantom was reconstructed. The processing results are shown in FIGS. 5A (uncalibrated source spectrum) and 5B (calibrated source spectrum). FIGS. 6A and 6B compare the uncalibrated and calibrated output results, respectively. In comparison, the Hounsfield Unit value HU of the image reconstructed using the calibrated spectrum is close to the expected value 0HU. In addition, the uniformity is improved, as the range of the profile for the calibrated anode is +/−8HU vs. +/11HU. It should be noted that the vertical scales of FIGS. 6A and 6B are quite different; FIG. 6B shows a marked improvement due to spectral calibration.

The effects of accurate spectral calibration can be clearly observed in the acquired image data following processing, such as with the improved results shown with respect to FIGS. 6A and 6B. Spectral calibration data itself can be stored and, alternately, can be plotted graphically and displayed.

Experiment 2

Figure 7B:
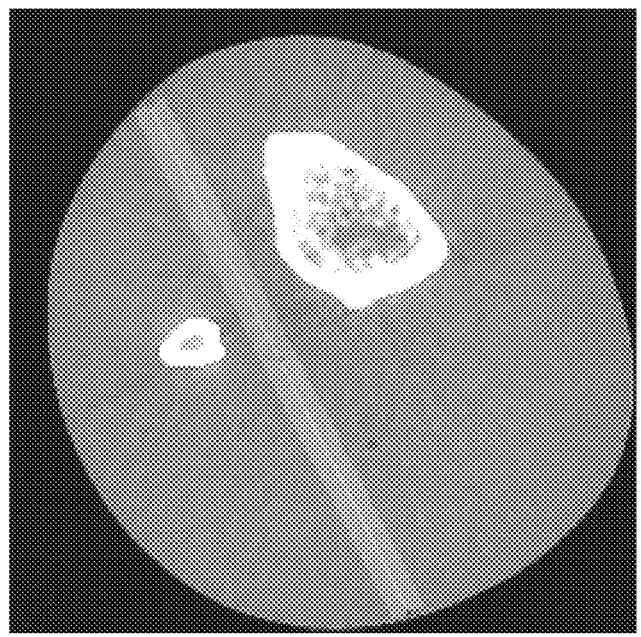
FIG. 7B shows a portion of a knee reconstruction for a calibrated X-ray source.
Figure 7A:
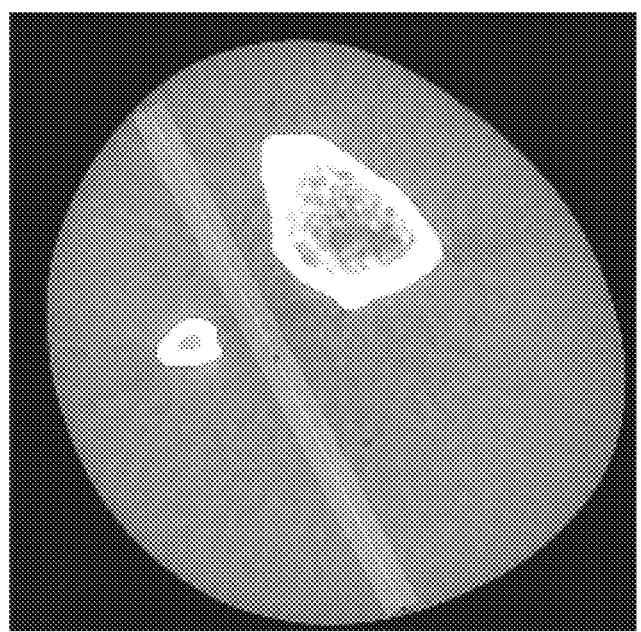
FIG. 7A shows a portion of a knee reconstruction for an uncalibrated X-ray source.
Figure 8A:
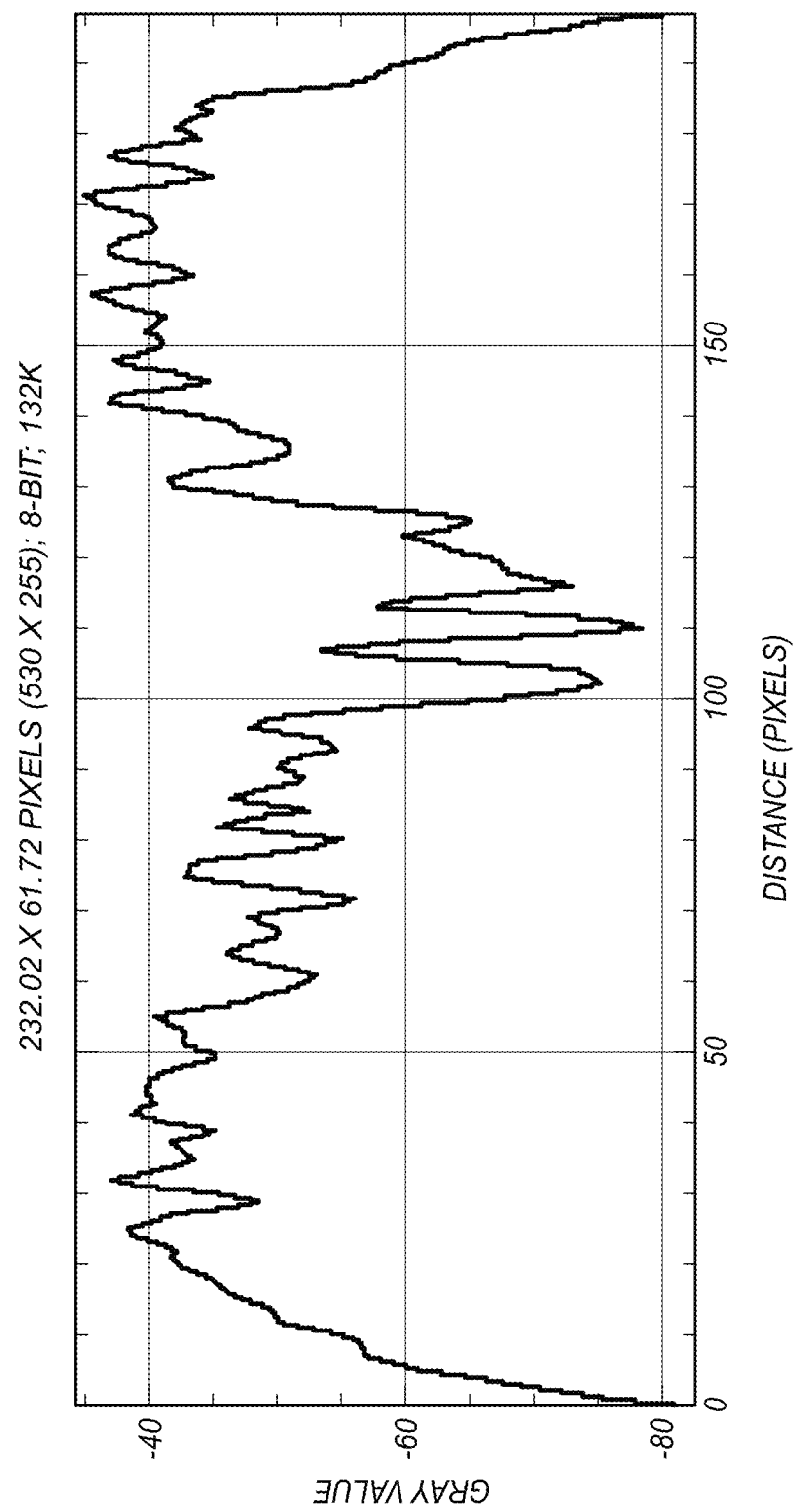
FIG. 8A is a graph showing Hounsfield unit values for an uncalibrated X-ray source.
Figure 8B:
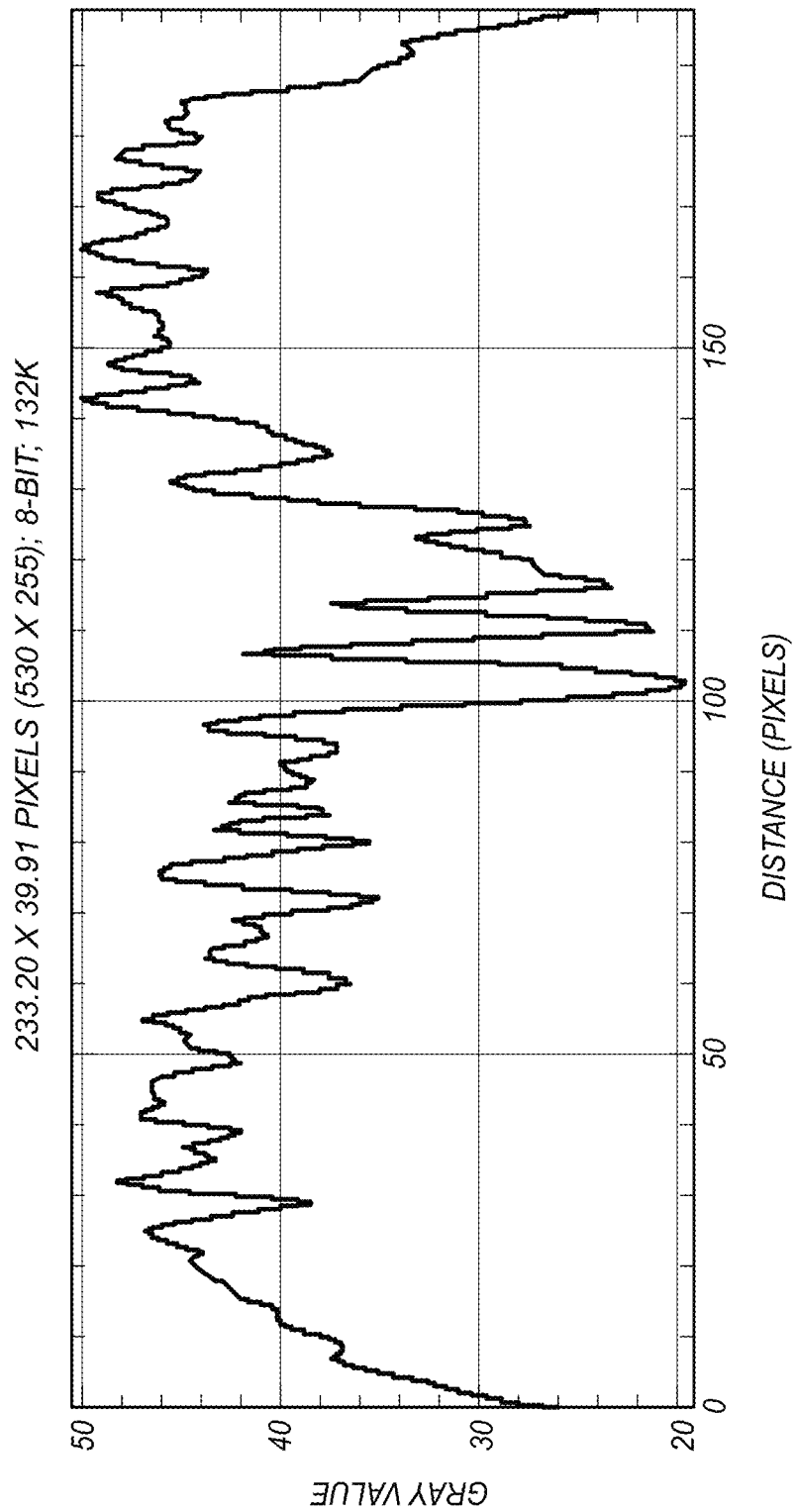
FIG. 8B is a graph showing Hounsfield unit values for a calibrated X-ray source.

Using the spectra of FIG. 4, a knee calibration phantom was scanned and reconstructed, and the results are shown in FIGS. 7A (uncalibrated) and 7B (following calibration). FIGS. 8A and 8B compare the uncalibrated and calibrated output results, respectively. In comparison, the HU of the soft tissue reconstructed using the calibrated spectrum is in the expected range, i.e., 20HU~70HU. In addition, the uniformity is improved, as the range of the profile is +/−15HU (calibrated, FIG. 8B) vs. +/−23HU (FIG. 8A).

As described, Applicants have developed a method for X-ray spectral calibration technique, comprising the steps of: (a) providing a phantom with known materials; (b) acquiring a plurality of X-ray projections of the provided calibration phantom; (c) estimating the X-ray spectrum using the acquired X-ray projections.

According to an aspect of the Applicants method, the X-ray spectrum is estimated by forming a digital phantom in the field of view, and modifying an initial X-ray spectrum by adjusting the calculated thicknesses of the virtual inherent filters data based on the given information until self-consistent conditions are obtained.

With at least one of the Applicants' methods, the phantom can be made of a single material (e.g., Al), multiple materials, or mixture.

With at least one of the Applicants' methods, the phantom can have any regular or irregular shape, and there is no constraint for phantom shape.

With at least one of the Applicants' methods, known materials either the composition of the materials or the material information that can be used for Monte Carlo simulation is known.

With at least one of the Applicants' methods, the prior information of the phantom allows identification of the material type for each voxel of the reconstructed volume.

With at least one of the Applicants' methods, the step of forming a digital phantom in the field of view can either be implemented by processing the volume reconstructed using the acquired X-ray projections or by registering a digital model of the phantom to the field of view using the acquired X-ray projections.

With at least one of the Applicants' methods, processing the volume uses prior information of the phantom (such as material distribution).

With at least one of the Applicants' methods, processing the volume might involve imaging techniques such as segmentation and registration, and the like.

With at least one of the Applicants' methods, it is preferred that the processed volume does not have any artifacts due to beam hardening or scatter.

With at least one of the Applicants' methods, the number of inherent virtual filters can be one or more.

With at least one of the Applicants' methods, the materials of the virtual inherent filters can be Al, Cu, W, and the like.

With at least one of the Applicants' methods, the shape of the inherent filters characteristic curve can be flat, bowtie, or other shapes.

With at least one of the Applicants' methods, the given information comprises the knowledge of detector response or detector spectrum (i.e., the multiplication of the anode spectrum and detector response).

With at least one of the Applicants' methods, self-consistent conditions include matching the scatter images, primary images, or scatter contaminated primary images obtained in different ways.

With at least one of the Applicants' methods, the scatter images can be obtained from Monte Carlo simulated scatter or from subtracting the analytical poly-energetic projections from the measured projections.

With at least one of the Applicants' methods, the primary images can be obtained from the analytical poly-energetic projections or from subtracting the estimated scatter using Monte Carlo calculation from the measure projections.

With the Applicants' methods, the scatter contaminated images can be obtained from measured projections or from adding the analytical poly-energetic projections and simulated scatter from Monte Carlo calculations.

With at least one of the Applicants' methods, reaching self-consistent conditions involves iteratively modifying the X-ray spectrum by adjusting the shapes of the inherent filters.

With at least one embodiment of the Applicants' methods, to iteratively modify the X-ray spectrum can involve optimization techniques (e.g., conjugate gradient methods, coordinate descent methods, etc.) or root finding techniques (e.g., Newton's method, Brent's method, etc.).

Figure 9:
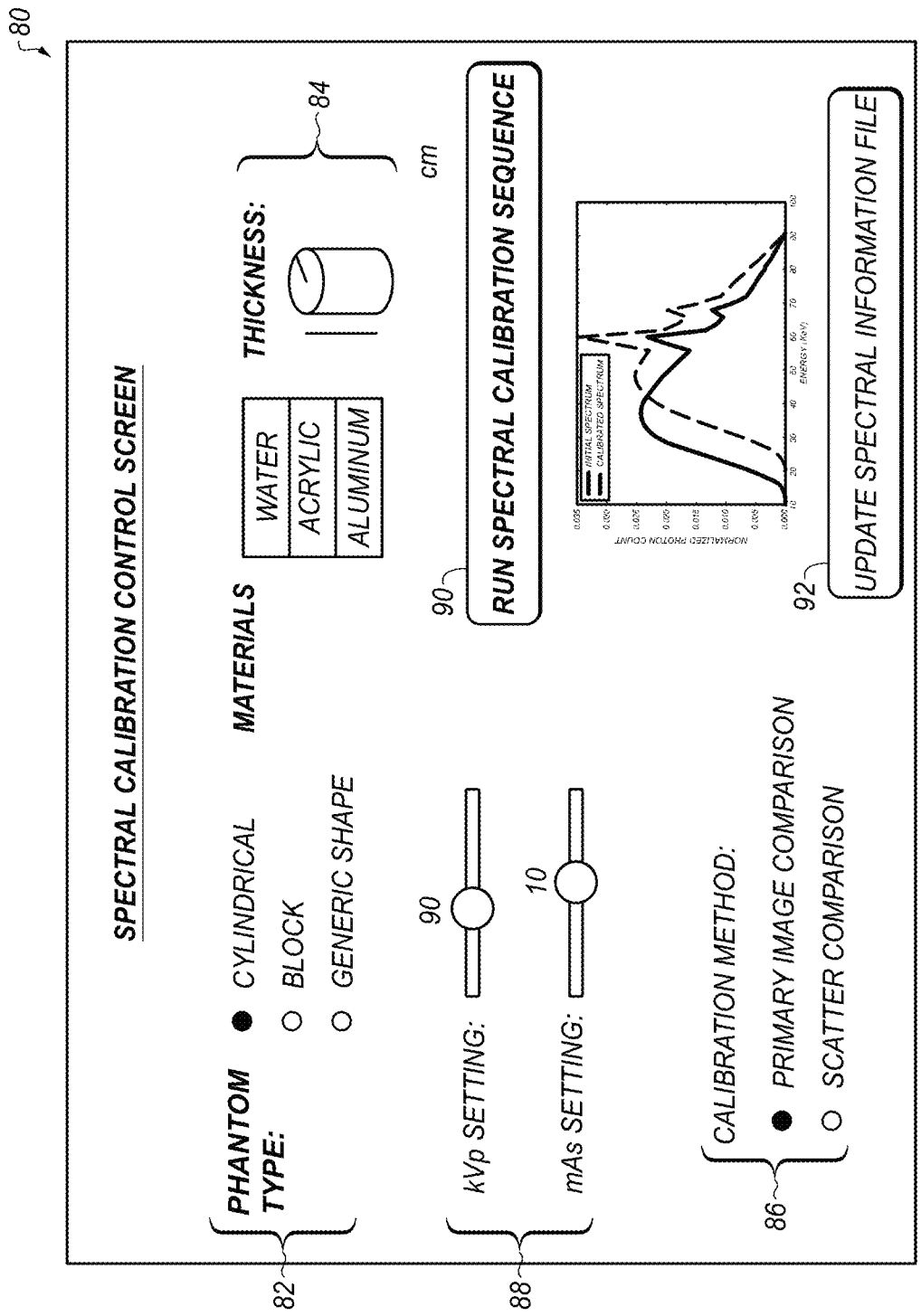
FIG. 9 shows an exemplary operator interface screen for spectral calibration setup and initiation.

It can be beneficial to provide a calibration utility as part of system control software. By selecting and using this utility, an operator can provide spectral calibration of the CBCT or other volume imaging apparatus without requiring special equipment or complex workflow. The plan view of FIG. 9 shows a graphical user interface (GUI) screen 80 according to an embodiment of the present disclosure. The operator can make any needed selection settings 82, 84, 86 for parameters such as phantom type and materials, dimensional values, and calibration type. Technique settings controls 88 can also be provided, such as for kVp or mAs values. A calibration control 90 then initiates spectral calibration, which can run unattended. A file update control 92 enables the operator to cause the spectral information file to be updated with the newly generated calibration data.

Consistent with an embodiment, the present invention utilizes a computer program with stored instructions that control system functions for image acquisition and image data processing for image data that is stored and accessed from external devices or an electronic memory associated with acquisition devices and corresponding images. As can be appreciated by those skilled in the image processing arts, a computer program of an embodiment of the present invention can be utilized by a suitable, general-purpose computer system, such as a personal computer or workstation that acts as an image processor, when provided with a suitable software program so that the processor operates to acquire, process, transmit, store, and display data as described herein. Many other types of computer systems architectures can be used to execute the computer program of the present invention, including an arrangement of networked processors, for example.

The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other network or communication medium. Those skilled in the image data processing arts will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It is understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:
1. A method for X-ray spectral calibration comprising:
   a) acquiring a plurality of X-ray projections of a calibration phantom formed of known materials;
   b) calculating the X-ray spectrum of an X-ray source according to the acquired X-ray projections; and
   c) storing, transmitting, or displaying the calculated X-ray spectrum wherein calculating the X-ray spectrum comprises:
reconstructing a digital phantom by processing the acquired X-ray projections, according to the known materials; and
modifying an initial X-ray spectrum for the X-ray source by adjusting the calculated thicknesses of inherent filters according to the digital phantom and the known materials.

2. The method of claim 1 wherein modifying the initial X-ray spectrum further comprises iteratively estimating the acquired projections.

3. The method of claim 1, wherein acquiring the plurality of X-ray projections comprises acquiring projections from a cone-beam computed tomography (CBCT) apparatus.

4. The method of claim 1, wherein calculating the spectrum comprises iteratively estimating scatter in the acquired projections.

5. The method of claim 4 further comprising reducing noise content in the estimated scatter.

6. The method of claim 1, further comprising generating a volume image according to the calculated X-ray spectrum.

7. The method of claim 1, further comprising providing a user interface control screen that has an instruction for initiating the spectral calibration.

8. The method of claim 1, further comprising accepting an operator instruction relating to calibration phantom dimensions, shape, or materials from a user interface control screen.

9. A method for X-ray spectral calibration comprising:
reconstructing a volume image of a calibration phantom according to a plurality of acquired X-ray projections of the calibration phantom;
processing the volume image according to prior knowledge of material forming the phantom to generate a digital phantom;
estimating scatter in the acquired X-ray projections according to the digital phantom and according to information about the material forming the phantom and the X-ray spectrum of an X-ray source;
correcting the acquired X-ray projections for scatter according to the estimated scatter to generate scatter corrected projections;
generating a plurality of synthetic projection images according to the digital phantom, information about the material forming the phantom, the X-ray spectrum, and inherent filtration computation for the X-ray source;
comparing the plurality of synthetic projection images with the scatter-corrected projections and updating the inherent filtration computation; and
providing a calibrated X-ray spectrum according to the comparison.

10. A method for X-ray spectral calibration comprising:
reconstructing a volume image of a calibration phantom according to a plurality of acquired X-ray projections of the calibration phantom;
processing the volume image according to prior knowledge of material that forms the calibration phantom to generate a digital phantom free of imaging artifacts;

estimating scatter in the acquired X-ray projections according to the digital phantom and according to information about the material forming the phantom and the X-ray spectrum of an X-ray source;
generating a plurality of synthetic projection images according to the digital phantom, information about the material forming the phantom, the X-ray spectrum, and inherent filtration computation for the X-ray source;
computing the scatter in the generated synthetic projection images according to the X-ray spectrum;
comparing the estimated scatter in the acquired X-ray projections with the computed scatter in the generated synthetic projection images and updating the inherent filtration computation; and
providing a calibrated X-ray spectrum according to the comparison.

11. A method for spectral calibration of an X-ray source comprising:
a) reconstructing a volume image of a calibration phantom according to a plurality of acquired X-ray projections of the phantom;
b) processing the volume image according to prior knowledge of material that forms the calibration phantom to generate a digital phantom free of imaging artifacts;
c) computing actual primary image content and estimated scatter content from the acquired X-ray projections;
d) computing synthetic primary image content and computed scatter content from the digital phantom;
e) comparing the actual primary image content against the computed synthetic primary image content; and
f) estimating the spectral content of the X-ray source and generating and storing the spectral calibration according to the comparison.

12. The method of claim 11 further comprising repeating steps c)-f) until predetermined criteria are satisfied.

13. The method of claim 11 further comprising displaying spectral calibration data.

14. A method for spectral calibration of an X-ray source comprising:
a) reconstructing a volume image of a calibration phantom according to a plurality of acquired X-ray projections of the phantom;
b) processing the volume image according to prior knowledge of material that forms the phantom to generate a digital phantom free of imaging artifacts;
c) computing an estimated primary image and estimated scatter content from the digital phantom;
d) computing the estimated total signal image by combining the estimated primary image and the estimated scatter image;
e) comparing the estimated total signal image against the acquired X-ray projections;
f) estimating a virtual inherent filtration of the X-ray source according to the comparison;
g) repeating procedures c)-f) to generate spectral calibration data until predetermined criteria are satisfied; and
h) storing, transmitting, or displaying the spectral calibration data to image acquisition.

15. The method of claim 14 wherein steps a)-g) execute automatically in response to an operator command.

* * * * *